Aug. 28, 1956     H. W. TREVASKIS     2,760,513
CONTROL PANEL FOR VEHICLE CENTRAL INFLATION SYSTEMS
Filed July 25, 1951                                2 Sheets-Sheet 1

INVENTOR
Henry William Trevaskis
by Benj. T. Rauber
his attorney

Aug. 28, 1956   H. W. TREVASKIS   2,760,513
CONTROL PANEL FOR VEHICLE CENTRAL INFLATION SYSTEMS
Filed July 25, 1951   2 Sheets-Sheet 2

2,760,513
CONTROL PANEL FOR VEHICLE CENTRAL INFLATION SYSTEMS

Henry William Trevaskis, Solihull, England, assignor to Dunlop Rubber Company Limited, London, England, a British company Application July 25, 1951, Serial No. 238,551

15 Claims. (Cl. 137—227)

This invention relates to a control panel for a vehicle equipped with a central inflation system.

Cross-country vehicles equipped with conventional pneumatic tired wheels frequently require to vary the tire inflation pressure according to the nature of the terrain traversed.

For example it is advantageous to have a low tire pressure when crossing soft and marshy ground since then a greater tire area is in contact with the ground and a better grip is obtained. Conversely when running on a firm surface or on a highway the tires should be fairly hard to give less rolling resistance, a smoother ride and longer wear.

Whilst for agricultural vehicles and the like it may be advantageous to be able to control the tire inflation pressure from the driver's seat whilst the vehicle is in motion, in the case of certain specialist army vehicles and the like it is a highly desirable and important feature. Armored fighting vehicles for example, frequently have to conduct operations across open country or in a desert, where the ground surface may quickly vary from a firm to a very soft composition. It is obviously advantageous, from the driver's point of view, to be able to vary the tire pressures to suit the nature of the terrain without having to leave the protection of the vehicle. Another type of specialist vehicle which may have to adjust its tire inflation pressure rapidly is an engineer's bridging lorry which frequently has to drive from a highway on to a marshy bridging site by a river.

Central tire inflation systems for vehicles are known and essentially comprise a compressor driven by the engine of the vehicle, a rotary seal or the like in the hub of each wheel having a connection leading to the inner tube of the tire, pneumatic pressure lines and means under the control of an operator for inflating or deflating the tires. Since it is undesirable to have the pressure lines leading to the wheels pressurized all the time, because of danger of leakage, an automatic valve is frequently fitted to the hub of each wheel, between the rotary seal and the tire, so that each tire may be isolated when the desired inflation pressure has been attained.

It is the object of this invention to provide a control panel for a central inflation system of this nature which incorporates means for separately controlling the inflation pressures of the front and rear tires, a pressure gauge for registering said pressures and means for checking the inflation pressures of said tires.

According to the invention a control panel for a central inflation system comprises a housing containing separate pressure controlling devices for the front and rear tires, each device comprising a control member, an inlet nozzle or port adapted to be connected to a source of compressed air, an outlet nozzle or port adapted to be connected to a set of tires, an exhaust conduit, an inlet valve and an exhaust valve, means operated by movement of the control member to first close the exhaust valve and then open the inlet valve, means operated by an increase in pressure in said tires to close the inlet valve when the selected inflation pressure has been attained, and means for indicating said inflation pressure.

The pressure controlling devices comprise twin valve mechanisms, each valve mechanism being preferably of similar construction to that described in Patent No. 2,668,035.

Preferably also an automatic non-return valve is fitted to the wheel of each tire to isolate said tire when it is inflated, and the control panel is provided with means to check the inflation pressure of said tire.

In order that the invention may be more fully described, reference is made to the accompanying drawings of which:

Figure 1:
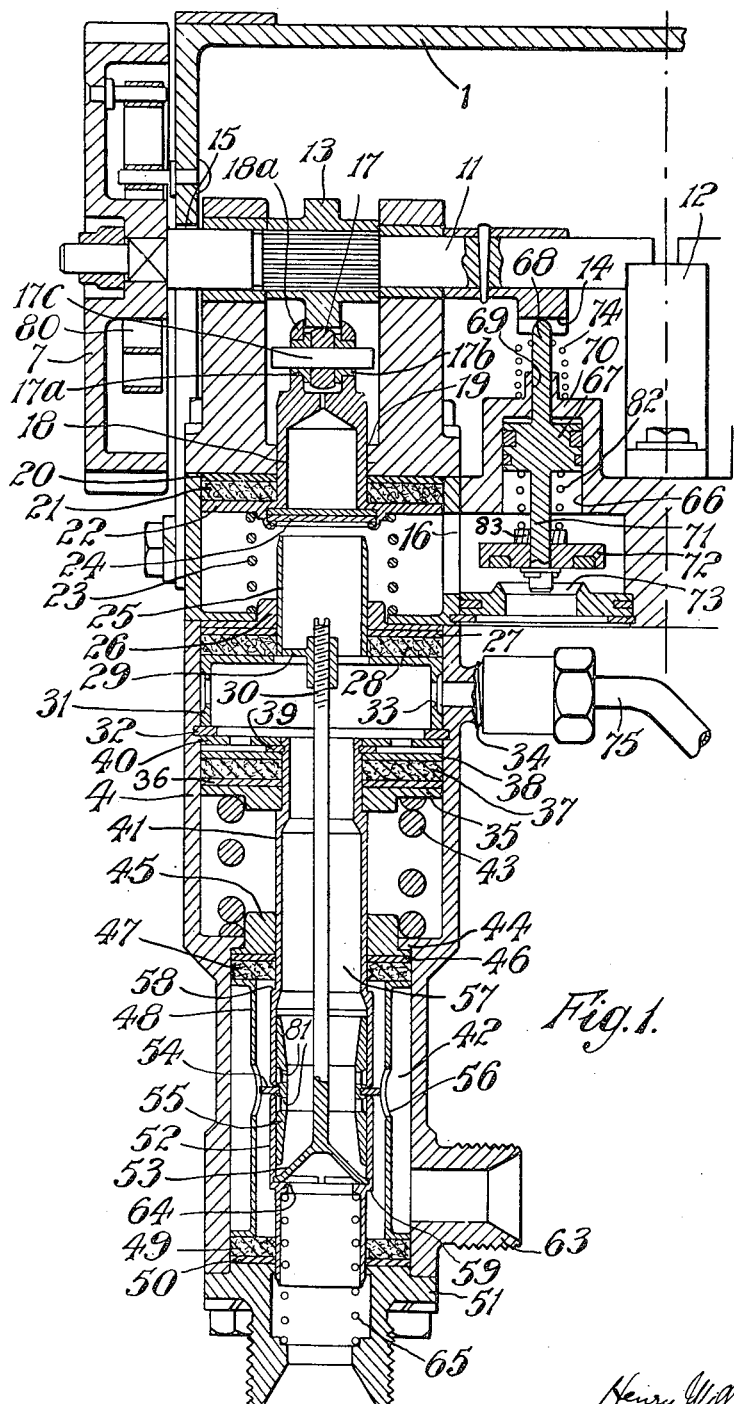
Figure 1 represents a sectional plan of half of the control panel for a central inflation system, according to one embodiment of the invention, taken on the line I—I, Fig. 3.
Figure 4:
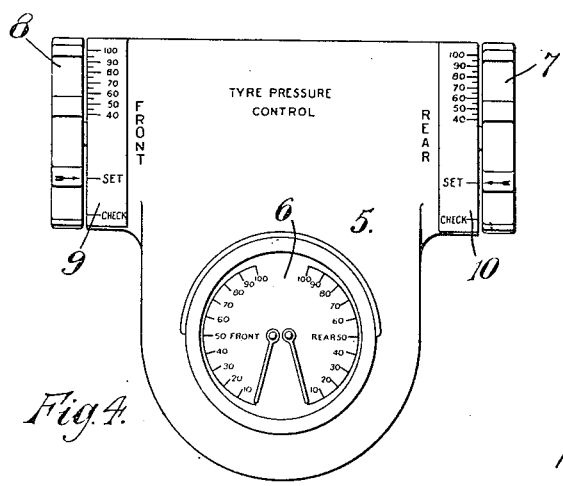
Figure 4 represents a front elevation of the same control panel.

According to one embodiment of the invention a control panel for a central tire inflation system comprises a housing 1 incorporating two valve mechanisms, each mechanism being constructed as shown in Figure 1. One mechanism is adapted to control the front wheel tire pressures and the other mechanism is adapted to control the rear wheel tire pressures. Means are provided to control each valve mechanism independently and a twin tire pressure gauge 6 (Figure 4) is provided to indicate the inflation pressures of each set of tires.

Figure 2:
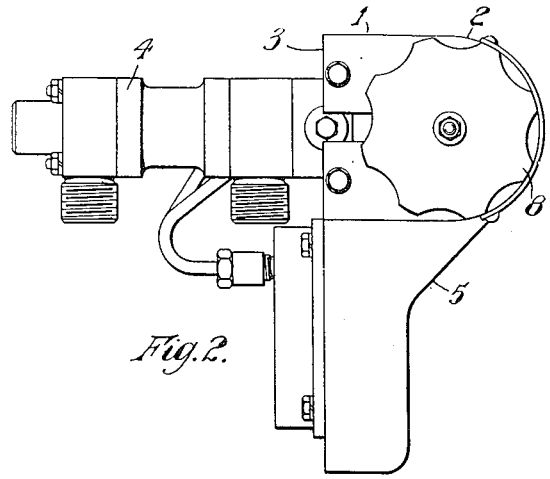
Figure 2 represents an end elevation of the same control panel for a vehicle central inflation system.

The housing 1 is of substantially rectangular section, having a face 2 convex about its longitudinal axis as shown in Figure 2. The face 3 remote from the convex face is provided with two cylindrical portions 4, one adjacent each end thereof and parallel with one another, and each of said cylindrical portions, together with its associated half of the housing, contains an independent valve mechanism. A part circular facia 5 extends from one side of the housing, at right angles to the cylindrical portions, and a twin tire inflation pressure gauge 6 is mounted therein. Knurled handwheels 7 and 8 are provided at each end of the housing to operate each of the valve mechanisms and pointers disposed on each wheel co-operate with scales 9 and 10 secured to each end of the convex face 2 of the housing.

Since the two sets of valve mechanisms, control means and pressure recording gauges are identical, only one of said combinations will be more fully described i. e. that set associated with the rear wheel tires of the vehicle.

As shown in Figure 1 a shaft 11 extends through a hole 15 in one end of the housing 1 to a location adjacent the center thereof, and this end seats in a bearing post 12 secured to the housing. The other end of the shaft projects exterior of the housing and this end is squared and the knurled handwheel 7 is secured thereto. Two cams 13 and 14 are fitted to the shaft, the cam 13 being secured adjacent the handwheel and in line with the longitudinal axis of the cylindrical portion 4, and the cam 14 adjacent the bearing post 12. The cam 13 has surfaces extending in opposite directions from a mid point so that when turned in either direction from said mid point it will depress a valve actuating mechanism. The cam 14 has a cam actuating surface extending in one direction only from the mid point so that it will actuate a valve closing mechanism when rotated in one direction but not in the other. An exhaust conduit 16 disposed in the wall of the cylindrical member 4 extends parallel with the longitudinal axis of the housing 1 to a location almost halfway along the said housing.

The cam 13 adjacent the handwheel bears on a roller 17 which is supported in a bifurcated portion 18a of a hollow cylindrical valve plunger 18 by means of bearings 17a and 17b and a pin 17c, said roller 17 being rotatable in its bearings. The valve plunger 18 is co-axial with the cylindrical member 4 and extends through a hole 19 in the wall of the exhaust conduit 16, a lubricating ring 21 and a sealing ring 20 being provided to prevent the escape of pressure fluid. The plunger 18 is provided with an outwardly extending annular flange 22 which cooperates with a coiled helical spring 23 to urge the valve plunger towards the cam 13.

The end of the valve plunger 18 remote from the cam, that is, the flange portion 22 of the plunger, extends into the exhaust conduit 16 and is provided with a seating 24 which upon downward movement of the plunger will contact the chamfered end of a tubular exhaust valve 25. Said tubular exhaust valve 25 extends axially through a bushing 26, a sealing ring 27 and a lubrication ring 28, and is connected at the end remote from the exhaust valve seating 24 to a spindle 30 by means of a spider 29. A small chamber is formed below the lubricating ring 28 by means of a cylindrical spacer 31 held in place by a snap ring 32. Holes 33 located in said spacer permit the flow of fluid from the cylindrical member 4 and thence through the nozzle 34 to the tire pressure gauge 6.

A collar 35 together with a sealing ring 36, lubricating ring 37 and retaining ring 38 constitutes a piston assembly, the whole assembly being securely held together by means of a snap ring 39. The said piston assembly is slidable in the bore of the cylindrical member 4 and is restricted in its movement towards the spacer 31 by a stop washer 40. A hollow cylindrical sleeve 41 is secured to the inner periphery of the said piston assembly and extends axially towards and into a pressure chamber 42. A compression spring 43 is fitted around a portion of said sleeve and one end thereof bears against an annular abutment 44 extending inwardly from the wall of the cylindrical member whilst the other end bears against the underside of the collar 35. Said sleeve 41 slides axially through a bushing 45, a sealing ring 46 and a lubricating ring 47, the whole assembly of said bushing and rings being held against the underside of said annular abutment 44 by means of a hollow cylindrical spacer 48. The end of said spacer 48 remote from said bushing 45 bears against a lubricating ring 49 and a sealing ring 50 and an externally threaded nozzle 51 holds the said rings securely against the end of the said spacer 48.

The spindle 30 extends axially through the sleeve 41 and is connected at the end remote from the exhaust valve 25 to the inlet valve 52 by a spider 53. Thus the exhaust and inlet valves are rigidly connected together and movement of one valve causes a correspondingly equal movement of the other valve. The end of the sleeve 41 adjacent the inlet valve is chamfered and is adapted to seat on one side of a valve ring 54. A hollow cylindrical valve seat locator 55 provided with ports 81 midway along its length fits into the bore of the sleeve 41 and also into the bore of the inlet valve 52 and is free to slide axially therein. The valve ring 54 is secured to the outer periphery of the said locator 55, substantially midway along its length and forms a seating for the chamfered end of the sleeve 41 on the one side and a seating for a chamfered end of the inlet valve 52 on the other. The spacer 48 is provided with holes 56 which communicate with the pressure chamber 42 and permit the flow of pneumatic pressure from said pressure chamber to an operating chamber 57.

The chamfered ends of the sleeve 41 and inlet valve 52 are of larger diameter than the portions slidably passing through the bushing 45 and the tire nozzle 51 respectively, the change in diameter taking place within the pressure chamber 42 and forming outwardly extending annular steps 58 and 59 respectively. The outside diameters of the smaller diameter parts of said sleeve and valve are equal to the inside diameter of the larger diameter parts when said parts are parallel. Thus when said sleeve and valve are seated and the chamber pressurized, the force exerted by said pressure on said steps 58 and 59 in an axial direction is balanced by the axial component of the force acting on the chamfered ends of the sleeve and valve in the other axial direction. The effort required to open the inlet valve 52 thus only need be sufficiently great to overcome the frictional resistance of said slidable inlet valve.

An inlet nozzle 63 communicates with the pressure chamber 42 and is adapted to be connected to a source of pneumatic pressure and is located in the wall of the cylindrical member 4 at the end remote from the cam 13 and extends parallel with the longitudinal axis of the housing 1.

The inlet valve 52 is provided midway along its bore with an inwardly extending annular abutment 64. The end of the inlet valve 52 remote from the valve ring 54 is axially slidable through the lubricating ring 49 and the sealing ring 50 and extends into a recess formed in the tire nozzle 51, said tire nozzle being adapted to be connected to the pneumatic pipe lines leading to the rotary joints in the hub of the rear wheels and thence to the tires. A compression spring 65 is fitted into the bore of the inlet valve 52. One end of the spring bears against the underside of the annular abutment 64 and the other end bears against the end wall of the recess formed in the tire nozzle 51, said spring 65 tending to force the inlet valve 52 onto the valve ring 54.

A cylinder 66 is formed in the side of the exhaust conduit 16 at the end remote from the valve plunger 18. The axis of said cylinder is at right angles to the axis of the conduit 16 and a piston 67 is slidable in said cylinder and has a plunger 68 integral therewith extending through a hole 69 in the base 70 of the cylinder and adapted to abut the second cam 14 on the operating spindle 11. Extending axially from the operative face of this piston is a valve stem 71 and a valve 72 is slidable thereon. Said valve is adapted to seat on a secondary exhaust valve seat 73 on the other side of the conduit remote from the piston 67 and this valve seat communicates with the atmosphere. The secondary exhaust valve is normally retained in an open position by spring means 74. A compression spring 82 is interposed between the operative face of the piston and a washer 83 which lies adjacent to and in contact with said valve 72, said valve being prevented from leaving the valve stem 71 by means of a washer and split cotter pin.

Figure 3:
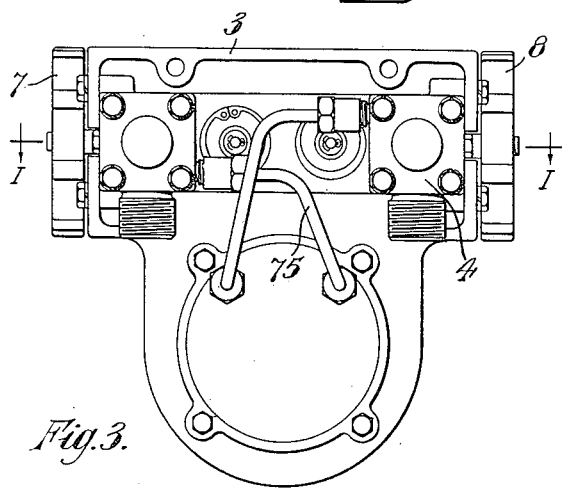
Figure 3 represents a rear elevation of the same control panel.

A pressure line 75 (Figures 1 and 3) connects the pressure gauge nozzle 34 with the associated tire pressure gauge mounted in the facia 5 extending from one side of the housing and this pressure gauge is of conventional design and is calibrated from 0–100 p. s. i.

The scale 11 (Figure 4) secured to the housing 1 has one end calibrated from 40–100 p. s. i., since 40 p. s. i. is normally the lowest pressure required and 100 p. s. i. is the highest. At the other end of the scale is the word "check." Intermediate the two is the word "set." A pointer is provided on the handwheel 7 and the angular movement of the handwheel from one end of the scale to the other is about 120°. A clockspring 80, Fig. 1, is associated with the handwheel, one end being secured to said wheel and the other to the end of the housing 1, the arrangement being such that on release the pointer on the handwheel returns to the "set" position.

It is to be understood that the foregoing description is in respect of one half only of the complete control panel, and that a duplicate set of mechanisms controls the pressure to the front wheel tires of the vehicle. The two handwheels 7 and 8 are marked "Front" and "Rear" respectively and the twin tire pressure gauge is similarly marked.

The control panel operates as follows. The tires, e. g. the rear tires, are inflated by turning the handwheel 7 so that the pointer registers with the desired pressure marked on the scale 10, e. g. 80 p. s. i. Rotation of said handwheel in this direction rotates the operating shaft 11 and the cams 13 and 14, the cam 13 associated with the valve plunger 18 forcing said plunger against its associated spring 23 to first close the tubular exhaust valve and then, by compressing the inlet valve return spring at the end of the cylindrical member 4, to open the inlet valve. Compressed air then flows from the pressure chamber 42, through the ports 81 disposed in the valve seat locator 55 and through the bore of the inlet valve and thence to the pressure lines by way of the tire nozzle 51. The pressure lines connect the tire nozzle with the rotary joints in the hubs of the wheels. Since the compressed air which flows through the bore of the inlet valve, also flows through the operating chamber 57, and thence by way of the pressure gauge nozzle 34 to the associated pressure gauge, the operator can observe how the pressure is mounting.

The pressure in the tires and the operating chamber 57 reacts on the face of the annular piston assembly (35, 36, 37, 38, 39 and 40) and forces it against its associated spring 43, towards the pressure chamber 42. When the selected inflation pressure has been attained the piston assembly has moved sufficiently far for the chamfered end of the sleeve 41, integral therewith, to seat on the valve ring 54 which is then moved by said sleeve along the bore of the spacer 48 towards and ultimately into contact with the chamfered end of the inlet valve, thus cutting off any further supply of compressed air from the source.

It is most undesirable that the pressure lines leading from the control panel to the tires should be continually pressurized, since not only may leakage occur at the rotary joint but also should the line or joint become damaged, the tire will quickly deflate. For this reason an automatic valve is incorporated in the wheel hub between the rotary joint and the seal. This valve is seated by the internal pressure in the tire but may be opened by a relatively small pressure e. g. 30 p. s. i. in the pipe line.

With the tires inflated, as described, to a pressure of about 80 p. s. i. the handwheel is released and returns to its original "set" position under the action of its associated clockspring 80. The tubular exhaust valve 25 immediately opens under the action of the spring 23 and compressed air in the pipe lines flows between the chamfered end of the tubular exhaust valve and the exhaust valve seating, through the exhaust conduit 16 and the secondary exhaust valve to the atmosphere. The greater pressure in the tires closes the automatic valves in the hubs, retaining the desired inflation pressure in the tires, whilst the rotary joint and pipe lines are unpressurized. The inlet valve remains closed, moving up with the cylindrical sleeve 41 and the annular piston assembly as the piston return spring 43 returns to its normal position.

It is necessary from time to time, to check the inflation pressures. To do this the handwheel is turned in the opposite direction until the pointer registers with the word "check." The second cam i. e. the cam adjacent the bearing post, first closes the secondary exhaust valve, then the first cam operates the valve mechanism, as hereinabove described, to give a pipe line pressure of about 30 p. s. i. Whilst the first cam is being rotated to give said pressure, the second cam further depresses the piston 67 and valve stem 71 so that said valve stem slides axially through the valve 72, whilst said valve still remains closed due to the force exerted by the spring 82. The said pressure is sufficient to open the automatic valves in the wheel hubs and consequently the greater pressure in the tires surges through the pipe lines, into the operating chamber and thence by way of the pressure gauge nozzle to the associated pressure gauge where the pressure can be read. Since the pressure in the tires is greater than 30 p. s. i. the annular piston assembly will be further deflected, thus opening the tubular exhaust valve, but compressed air is prevented from escaping from the housing and hence to atmosphere by the secondary exhaust valve which remains closed during the whole of a "checking" operation.

Having checked the tire inflation pressures the operator releases the handwheel which returns to the "set" position. The pipeline is connected with exhaust, as hereinabove described and the automatic valves prevent the escape of compressed air from the tires.

Having described my invention what I claim is:

1. A control panel for a central inflation system comprising a housing having an inlet nozzle, a delivery nozzle, and a fluid passage from said inlet nozzle to said delivery nozzle, an inlet valve operable to close said fluid passage, a primary exhaust valve structure comprising a slidable tubular exhaust valve operatively connected to said inlet valve and having an exhaust passage from said fluid passage and a passage closure member movable to close said exhaust passage, a piston slidable within the housing and operable by pressure in said fluid passage to close the inlet valve when a desired inflation pressure has been attained, a secondary exhaust valve in series with said primary exhaust valve structure and operable to connect the exhaust passage through said tubular exhaust valve to atmosphere, a manual control having a pair of elements, one acting on said passage closure member and the other on said secondary exhaust valve and movable in one direction from a predetermined set position to first close said primary exhaust valve structure and displace said tubular exhaust valve to a selected position and open said inlet valve during an inflation operation and movable in the opposite direction to close said secondary exhaust valve, and to close said passage closure member and displace said tubular exhaust valve and open said inlet valve to a limited extent during a pressure check operation, and a gauge communicating with said tubular exhaust valve for indicating said inflation pressure.

2. The control panel of claim 1 in which the manual control comprises a rotatable shaft, a spring secured between said shaft and housing to return said shaft to said predetermined set position after movement in either direction, a cam fixed on said shaft to engage the primary exhaust valve structure in both directions of return, and a second cam fixed on said shaft to engage said secondary exhaust valve when rotated only in one direction.

3. The control panel of claim 2 in which the inlet valve comprises a pair of co-axial, axially movable, spring-loaded tubular members forming a passage for fluid under pressure to said delivery nozzle and to said tubular exhaust valve, one of said members being connected to the primary exhaust valve structure and the other being responsive to pressure in the outlet nozzle, a sleeve slidable in the adjacent ends of the tubular elements having a plurality of radially-extending holes in its wall and a seating ring extending radially from the outer periphery of the sleeve between the adjacent ends of the tubular members.

4. The control panel of claim 3 in which the diameters of the tubular members within the pressure chamber are stepped radially outwardly, the radial width of the steps formed being equal to the thickness of the walls of said members.

5. The control panel of claim 2 in which the secondary exhaust valve has a piston slidable in a cylinder, said piston having a stem extending co-axially from one side of the piston to the second cam and a stem projecting co-axially from the opposite side and having a spring-loaded valve slidable thereon, spring-urged to contact a secondary exhaust valve when said plunger is depressed during a pressure checking operation.

6. A control panel for a central inflation system which comprises a housing having an inlet for air under pressure and a delivery outlet, an inlet valve between said inlet and said delivery outlet, said inlet valve comprising a pair of aligned tubular elements, an annular valve seat between the opposed ends of said tubular elements and a cylindrical valve seat locator connected to said annular valve seat, a primary exhaust valve comprising a tube aligned and in fluid communication with the tubular elements of said inlet valve and a closing plate, a spindle from said tube to the tubular element on the opposite side of said valve seat, a piston movable axially of said tube and secured to the tubular element of said inlet valve nearest said tube, a spring pressing said piston toward said primary exhaust valve, a pressure gauge in fluid communication with said housing from a point between said inlet valve and said primary exhaust valve, a secondary exhaust valve in fluid communication with the exhaust side of said primary exhaust valve, a rock shaft; a spring to hold said rock shaft in a predetermined set position, a cam fixed on said rock shaft to engage the closing plate of said primary exhaust valve to displace it and said tube when rocked in either direction, and a second cam engaging said secondary exhaust valve to close said secondary exhaust valve only when said shaft is rotated in one direction.

7. A control panel for a central inflation system comprising a housing having an inlet opening, a delivery opening and an exhaust opening, and having a fluid passage from said inlet opening to said delivery opening and an exhaust passage from said fluid passage to said exhaust opening, an inlet valve disposed in said fluid passage between said inlet and delivery openings, a primary exhaust valve disposed in said exhaust passage between said fluid passage and said exhaust opening and operatively connected to said inlet valve, a device responsive to the pressure between said inlet valve and said primary exhaust valve to close said inlet valve, a pressure gauge opening between and in fluid communication with said inlet valve and said primary exhaust valve, a secondary exhaust valve between and in fluid communication with said primary exhaust valve and said exhaust opening and a manual control for closing said primary and secondary exhaust valves and for opening said inlet valve, which manual control comprises a manually operated common rock shaft having a predetermined set position and rotatable from said set position in one direction to close only said primary exhaust valve and open said inlet valve a variable distance and in the opposite direction to close both primary and secondary exhaust valves and to open said inlet valve from a position corresponding with said predetermined set position of said rock shaft, and comprising cam devices operatively connecting said rock shaft to said primary and secondary exhaust valves.

8. The control panel of claim 7 comprising a pair of said cams, one for said secondary exhaust valve and the other for said primary exhaust valve.

9. The control panel of claim 7 in which said inlet valve comprises two closure elements, one movable through said primary exhaust valve to a selected opening position, and the second movable by said pressure responsive device to close said valve.

10. A control panel for a central inflation system comprising a housing having an inlet port, a delivery port, an exhaust port and a pressure gauge port all in fluid communication one with the other, a secondary exhaust valve movable to interrupt the flow of fluid through said exhaust port, a primary exhaust valve movable to control the flow of fluid between said secondary exhaust valve and said inlet port, delivery port and a pressure gauge port, an inlet valve movable to control the flow of fluid between said inlet port and said pressure gauge port and said primary exhaust valve, a partition in said housing between said primary exhaust valve on one side thereof and said inlet port, delivery port and pressure gauge port on the other side thereof, and having an opening therethrough, a tube slidable fluid-tightly in said opening and having an exhaust valve seat to be closed by said primary exhaust valve and movable axially by said primary exhaust valve, said tube having a spindle to open said inlet valve when moved axially by said exhaust valve, a piston between said inlet valve on one side and said pressure gauge port and said tube on the other side and movable by pressure in said housing to press said inlet valve closed independently of the position of said tube, a spring to move said piston in a direction opposite to its movement by said pressure, and manual means movable in one direction from a set position to close both said secondary exhaust valve and said primary exhaust valve to open said inlet valve and movable in another direction to close only said primary exhaust valve and move said tube to open said inlet valve.

11. The control panel of claim 10 in which said housing has a partition between said inlet port and said piston and in which said inlet valve comprises a floating annular valve seat in the space between said inlet port and said partition, a tubular valve member fixed to and delivering through said piston and slidable fluid-tightly in said partition to seat on one side of said annular valve seat and a second tubular valve member sealed fluid-tightly between said delivery port and said inlet port and slidable to close on the opposite side of said annular valve seat and in which said tube has a member extending into abutment with said second tubular valve member.

12. The control panel of claim 10 in which said manual means comprises a shaft having a pair of cams fixed thereon, one for said primary exhaust valve having valve closing cam surfaces on each side of a neutral point, and one for said secondary exhaust port having a valve closing cam surface on one side only of said neutral point.

13. A control panel for a central inflation system comprising a housing having an inlet port, a delivery port, an exhaust port and a pressure gauge port, and fluid passages connecting said ports, a secondary exhaust valve spring-pressed to open position and movable to close said exhaust port and its associated fluid passage, an inlet valve mechanism which comprises a valve seat ring, within said ring a valve seat locator carrying said ring and having openings for the passage of fluid, an axially slidable tubular primary inlet valve opening to said delivery port and sealing the flow of fluid to said delivery port from said inlet port, a spring pressing said primary inlet valve to engage one side of said valve seat ring, a second tubular inlet valve slidable axially to seat on the opposite side of said valve seat ring, a piston between said inlet port and delivery port on one side and said pressure gauge port and exhaust port on the other side slidable in said housing and having an opening in which said second tubular inlet valve is secured fluid-tightly; a spring holding said piston resiliently from displacement of said second tubular inlet valve and valve seat ring, said piston being displaceable against said spring by fluid pressure on the opposite side of said piston to the side engaged by said spring; a sealing ring between the wall of said housing and said second tubular valve to seal said piston from said inlet port; a partition wall between said pressure gauge port and said exhaust port; a tubular exhaust valve seat slidable axially and fluid-tightly in said partition and having an extension through said second tubular inlet valve to abut said first tubular inlet valve; a primary exhaust valve movable to seat on said tubular valve seat to close it and displace it and through said extension to move said primary tubular inlet valve to open position, and means manually movable in one direction from a neutral point to close both of said exhaust valves and in the opposite direction to close only said primary exhaust valve.

14. The control panel of claim 13 in which said manually movable means comprises a rotatable shaft, a cam fixed on said shaft having primary exhaust valve closing surfaces extending from each side of a neutral point and a second cam having a secondary exhaust valve closing surface extending on one side of said neutral point.

15. The control panel of claim 14 having a spring acting on said shaft to return it to neutral position.

References Cited in the file of this patent
UNITED STATES PATENTS

| | | |
|---|---|---|
| 1,588,107 | Harris | June 8, 1926 |
| 1,747,910 | Siefarth | Feb. 18, 1930 |
| 2,173,369 | McElroy | Sept. 19, 1939 |